Figure 1:
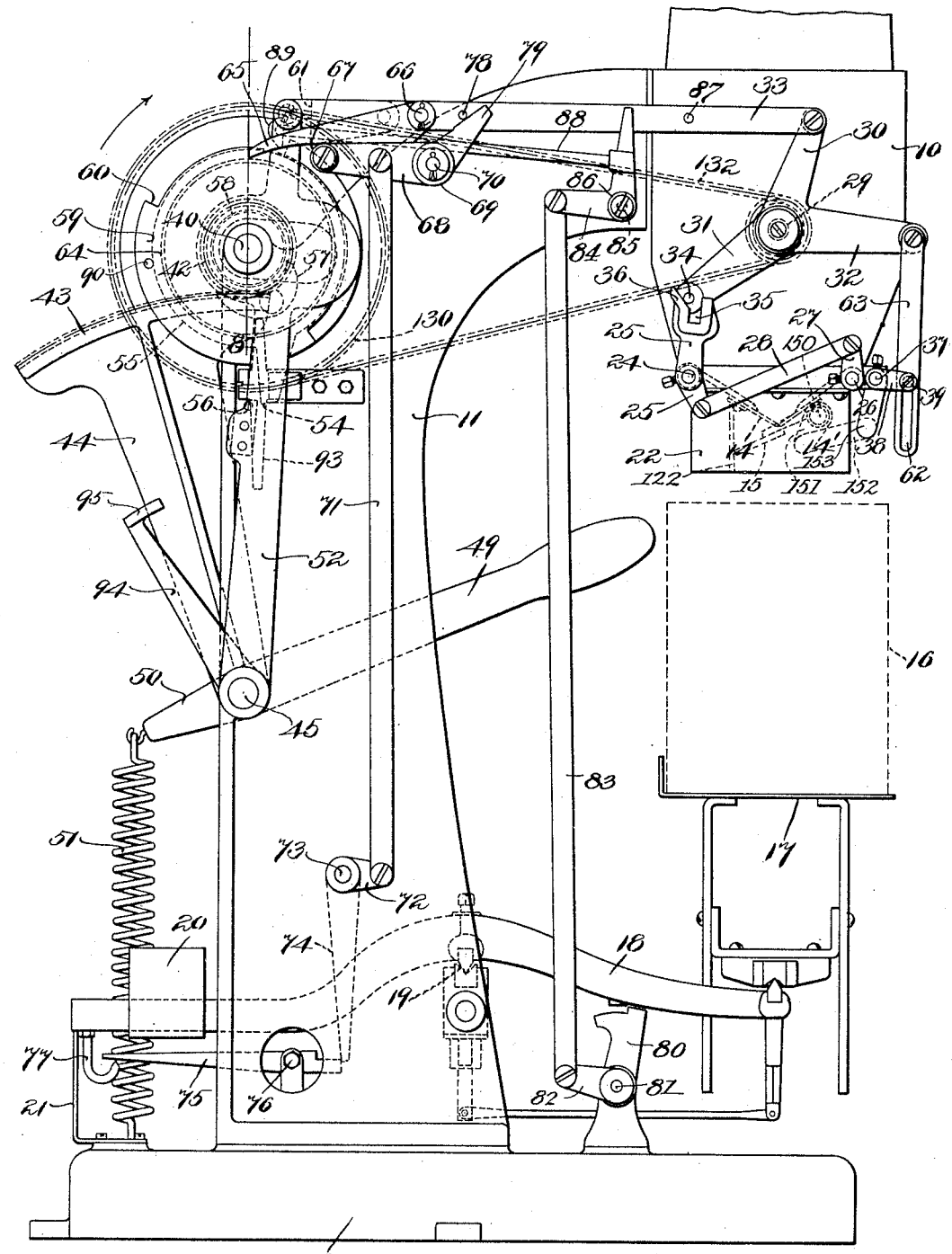

No. 826,475. PATENTED JULY 17, 1906.
W. S. SCALES.
WEIGHING MACHINE.
APPLICATION FILED APR. 3, 1905.

4 SHEETS—SHEET 1.

Witnesses:
George T. Dike
J. Henry Parker

Inventor:
William S. Scales
by Wm. A. Copeland
Attorney

W. S. SCALES.
WEIGHING MACHINE.
APPLICATION FILED APR. 3, 1905.

Witnesses:
George T. Dike
J. Henry Parker

Inventor:
William S. Scales
by Wm. A. Copeland
attorney

UNITED STATES PATENT OFFICE.

WILLIAM S. SCALES, OF MEDFORD, MASSACHUSETTS, ASSIGNOR, BY MESNE ASSIGNMENTS, TO MERCANTILE TRUST COMPANY, TRUSTEE, OF BOSTON, MASSACHUSETTS, A CORPORATION OF MASSACHUSETTS.

WEIGHING-MACHINE.

No. 826,475.    Specification of Letters Patent.    Patented July 17, 1906.

Application filed April 3, 1905. Serial No. 253,382.

*To all whom it may concern:*

Be it known that I, WILLIAM S. SCALES, of Medford, in the county of Middlesex and State of Massachusetts, have invented certain new and useful Improvements in Weighing-Machines, of which the following is a specification.

This invention relates to weighing-machines in which a predetermined weight of material is supplied to a box or other receptacle while on the scale-pan and then the feed is cut off by the tipping of the scale-beam, and has special reference to that class of such weighing-machines in which after the receptacle has received a portion of its weight the remainder of the load will be supplied by a relatively small stream of material.

Heretofore in some machines the receptacle has received the first portion of the load through one feed-supply and then the receptacle is carried to a position on the scale where it receives the remainder of its load, and in some machines the receptacle has remained stationary and the feed-chute is shifted. In other machines the receptacle and both feed-chutes are stationary during the feeding; but the full stream is first supplied and then cut off and then the drip-stream is opened. In still others there is only one feed-chute; but after the receptacle is partially filled the stream is reduced in quantity of flow to produce a drip-stream for the balance of the load.

In the present invention one object is to utilize two streams at the same time into the same receptacle—both the full stream and the drip-stream—during the first part of the filling and then to cut off the load-stream after a predetermined period of time, leaving the drip-stream alone still flowing until cut off by the tipping of the scale-beam.

Another object of the invention is to provide feed mechanism especially adapted for coffee berries or beans or the like, so as to feed them uniformly and without crushing or bruising them.

Another object of the invention is to provide means by which the special feed mechanism for berries or beans may be thrown out of commission and the feed-passage shifted for better adaptation to finer material, such as ground coffee or the like.

The invention is especially intended for use in what are commonly called "hand-machines," in which the power for operating the machine is stored up by mechanism manually operated after each tipping of the scale and automatic closing of the feed, and by "manually operated" I mean to include any mechanism operated by the attendant through his own strength, whether by hand or foot. It is not intended, however, to limit the claims to hand-machines even of the broad character above defined; but they are intended to include power-operated machines wherever applicable.

The machine is provided with a hopper having two feed-passages for delivery of the material to the receptacle while on the scale-pan. Each passage is controlled by gates which are opened and closed at the proper time to permit the flow and cut off the flow of the material. The gates of one passage are constructed and operated to afford a larger freer flow of material than the gate of the other. For convenience of designation the larger flow will be termed the "main stream" and the smaller flow the "drip-stream." In the machine shown the main stream passage has two gates coöperating with each other and the drip-stream passage has only one gate. Means are provided by which both sets of gates are opened to permit simultaneous flow for a predetermined period, and then the main stream is automatically cut off, leaving the drip-stream flowing until its scale-beam tips under the weight of the required load, and mechanism is provided which is actuated by the tipping of the scale-beam to cut off the drip-stream. In the special means shown the gates are operated by a three-arm rocking lever, one arm of which has a link connection with the set of gates for the main stream, another arm has a link connection with the gate for the drip-stream, and the third arm has a link connection with a connecting-rod which is operated, through intermediate mechanism by a rotary member driven by a rocking segment-gear. The segment-gear is actuated in one direction by a hand-pressed lever with which a spring is connected, the spring being given tension by the pressing of the lever, and when the lever is released the segment-gear will be rotated by the spring in the reverse direction, causing said rotary member during the first part of its movement to actuate the said connecting-rod and the three-armed lever to open both sets of gates, and after the rotary member has moved a certain predetermined distance it throws the connecting-rod in the reverse direction far enough to close the main-stream gates, but not far enough to close the drip-stream gate. The tipping of the scale-beam controls mechanism which is thrown into engagement with said rotary member to still further actuate the connecting-rod and close the drip-stream gate.

This invention is an improvement on the machine shown in United States Patent No. 780,174, dated January 17, 1905, to S. D. Hedge, and as it has to do especially with the hopper and feed mechanism the driving mechanism and the weighing mechanism proper will be shown only so far as deemed necessary to properly illustrate the present invention.

The invention will now be fully described, and the novel features thereof will be particularly pointed out in the claims at the close of the specification.

Figure 2:
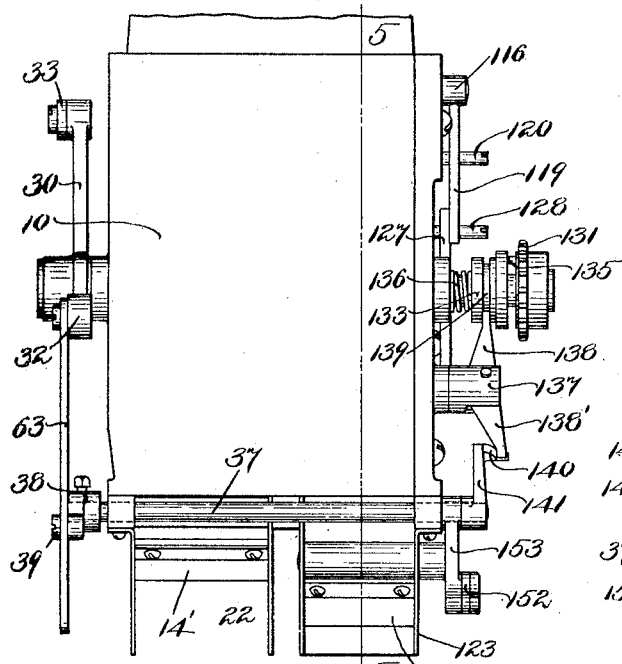
Figure 3:
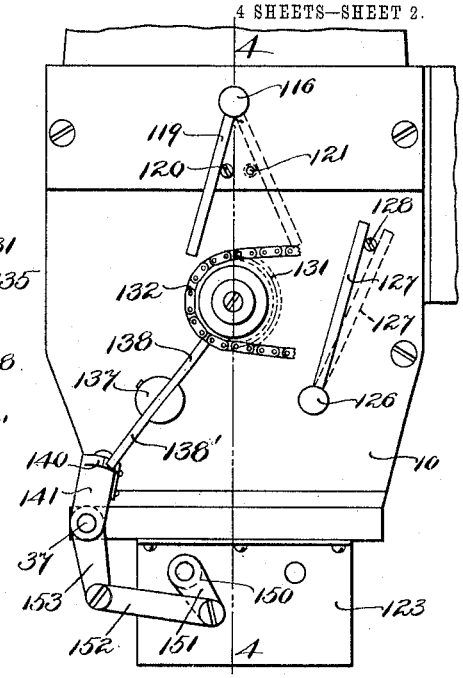
Figure 4:
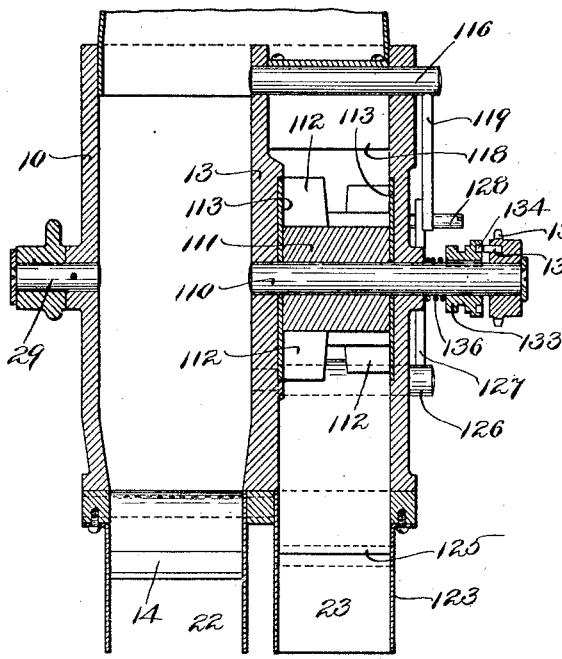
Figure 5:
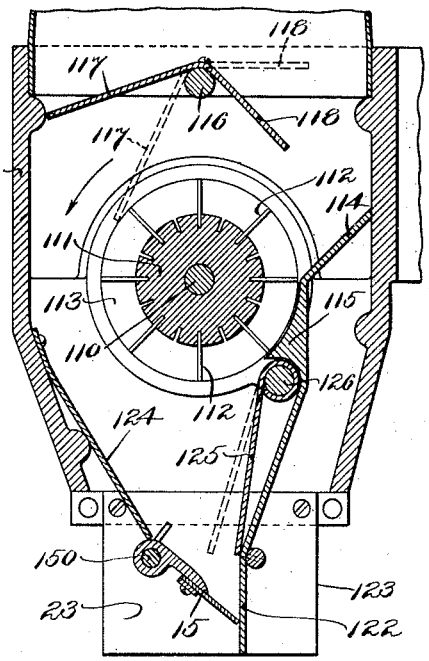
Figure 6:
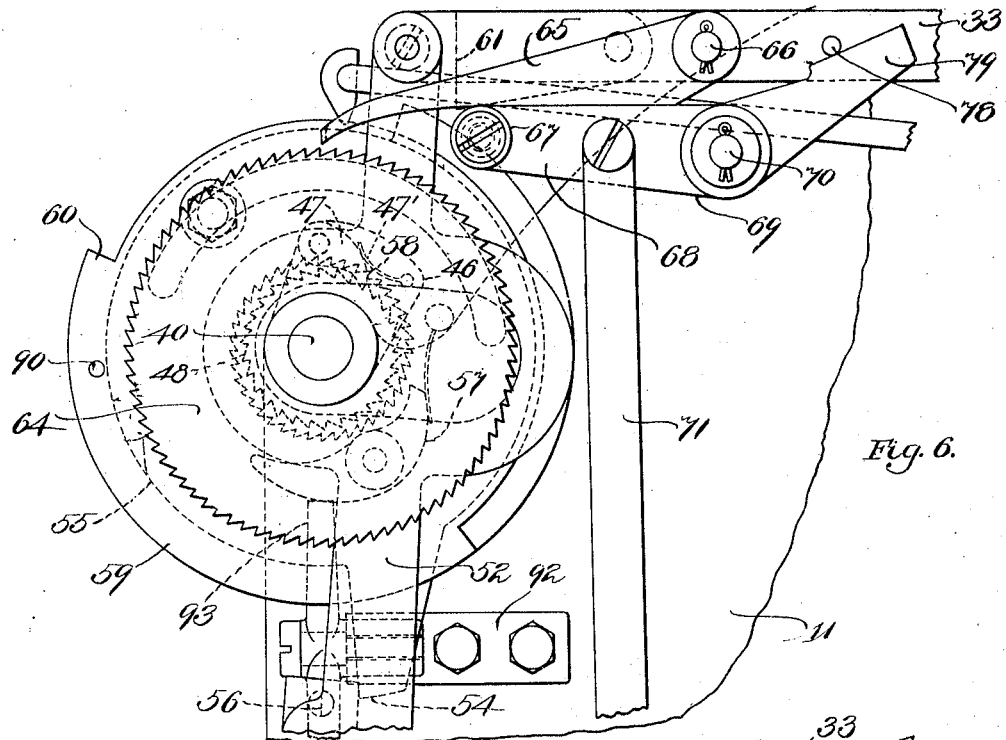
Figure 7:
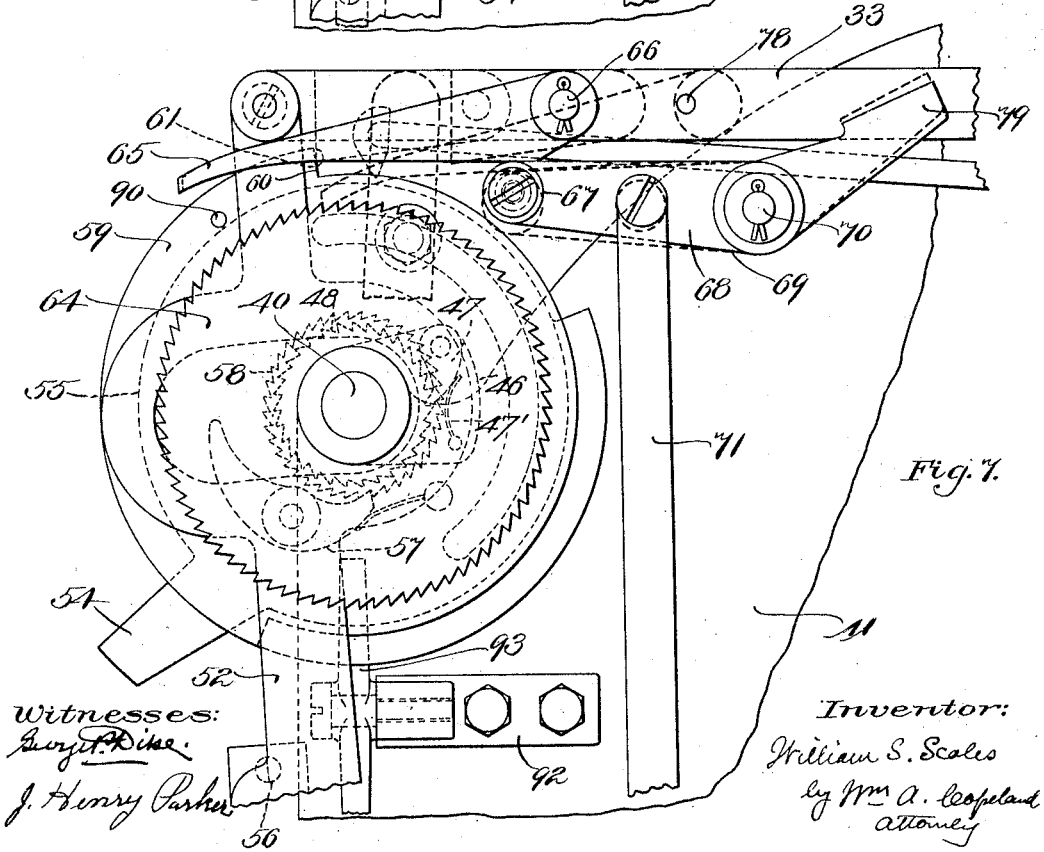
Figure 8:
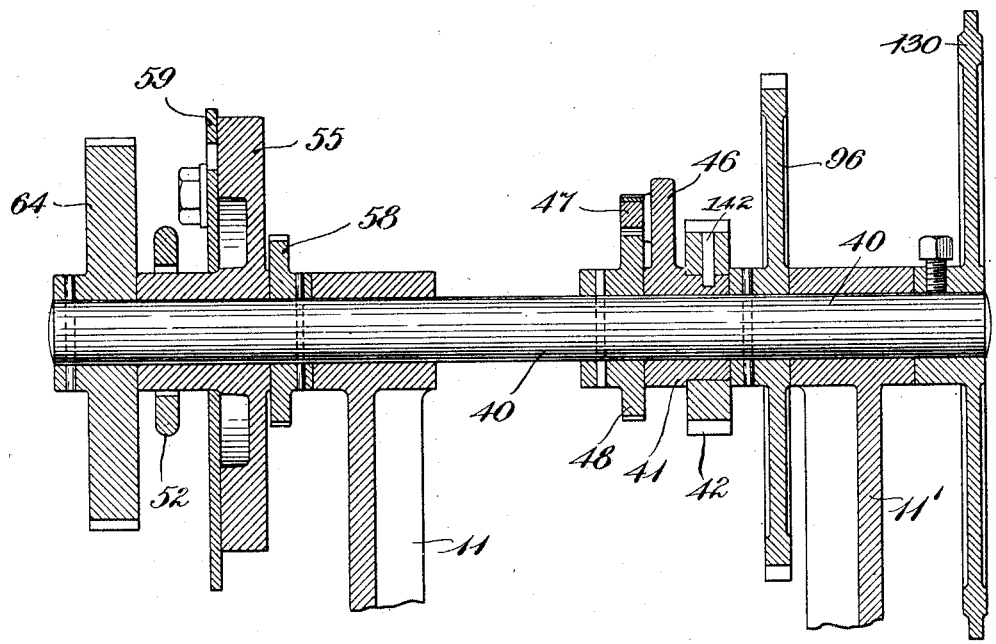

In the drawings, Figure 1 is a side elevation of a machine embodying the invention. Fig. 2 is a front elevation of the hopper and connections, enlarged from Fig. 1. Fig. 3 is a side elevation of the hopper and connections, taken on the opposite side from that shown in Fig. 1 and enlarged. Fig. 4 is a vertical section on line 4 4 of Fig. 3 looking toward the right hand of Fig. 3. Fig. 5 is a vertical section on line 5 5 of Fig. 2 looking toward the left hand of Fig. 2. Figs. 6 and 7 are detail views representing the gate-actuating mechanism connected with the driving mechanism. Fig. 8 is an enlarged vertical sectional view on line 8 8 of Fig. 1.

The hopper 10 is supported between two arms of the parallel standards 11 and 11', which rise from the base 12. The hopper is divided vertically by the partition 13, forming two sluiceways or passages 22 23 for the material, one of which is adapted to be closed by two gates 14 14' and is a conduit for the main stream and the other of which is adapted to be closed by a single gate 15 and is a conduit for the drip-stream. Both sluiceways feed material to the receptacle 16 while on the scale-pan 17. The scale-pan 17 is supported by the scale-beam 18, which is fulcrumed at 19. The rear end of the scale-beam carries an adjustable counterweight 20 and is limited in its downward movement by the stop 21. The gate 14 is fast to a rocker-shaft 24, on which is fast mounted a bell-crank lever 25. The gate 14' is fast to rocker-shaft 26, which is connected by a rocker-arm 27 and link 28 with bell-crank lever 25, so that the rocking of lever 25 will operate both gates 14 14' simultaneously to open or close them.

Fulcrumed on a stud 29, which projects from the side of the hopper, is a three-arm rocking lever 30 31 32. Arm 30 is pivoted to one end of a connecting-rod 33, whose other end is connected with mechanism for actuating said lever, as will be hereinafter described. Arm 31 is provided with a stud 34, which engages with a slot 35 in the upper end of bell-crank lever 25 to actuate said lever 25. The slot 35 is formed with the upper portion 36 of the side wall which is the farther from the center of oscillation of the three-arm lever inclined outwardly, so that in the first part of the turning of the arm 30 to the left and arm 31 to the right, which carries the stud 34 down in the slot 35, the stud will move from the position shown in Fig. 1 down the inclined portion of the slot without moving the bell-crank lever 25, and the continued turning in the same direction will cause the said stud to bear against the right-hand vertical side of the slot and turn the upper arm of lever 25 to the right and turn the lower arm to the left, thus opening both gates 14 14'. During the first part of the return movement of the three-arm lever the stud 34 will bear against the left-hand vertical wall of the slot 35 and turn the upper arm of lever 25 to the left and close the gates 14 14', and when the stud reaches the inclined portion of the slot it will ride up the incline without further movement of the gates 14 14'.

The drip-stream gate 15 is fast to a rocker-shaft 150, carrying an arm 151, connected by a link 152 with a rocker-arm 153 on rocker-shaft 37. Fast to said shaft 37 is also a rocker-arm 38, Fig. 1, carrying a stud 39, which engages with a slot 62 in the lower end of link 63, the upper end of said link being pivoted to arm 32 of said three-arm lever.

The distance of travel of the connecting-rod 33 is such that when it moves to the left from the position shown in Fig. 1 and turns the three-arm lever to open the gates 14 14' the arm 32 will turn up through an arc sufficient to raise the link 63 a little more than enough to bring the lower end of the slot 62 into engagement with stud 39, so that it will turn the rocker-arm 38 and shaft 37 far enough to open the drip-stream gate 15. On the return or closing movement the link 63 will have to move down the full length of the slot to bring the upper end of the slot into engagement with the stud 39 before it will begin to turn the rock-shaft 37 to close the drip-stream, but, as already described, the lever 25 will be turned to close the main-stream gates 14 14' during the first part of the return movement. Thus the drip-stream will be allowed to flow after the main stream is cut off. Mechanism is provided by which the connecting-rod 33 is thrown the full stroke to the left as viewed in Fig. 1 by the stored-up power to open the gates, and after an open period it is thrown a part of its full stroke to the right by the stored power far enough to close the main stream, but not the drip-stream, and then checked and then thrown the remainder of its stroke to the right by mechanism actuated by the tipping of the scale-beam to close the drip-stream.

The mechanism shown for storing up the power when hand-power is used and operating the machine will now be described.

A shaft 40, which is the main shaft of the machine, has loosely mounted thereon a hub 41, to which is fast secured a pinion 42. The pinion may be secured fast to the hub in any suitable way. In actual use I have found a tight driving fit to be sufficient. In Fig. 8 of the drawings a pin 142 is shown as one means for securing the pinion to the hub or for securing it more firmly. Intermeshing with said pinion 42 is a segment rack or gear 43 on the end of an arm 44, which is mounted fast on a rock-shaft 45. The hub 41 has an arm 46, to which is secured a spring-tensioned pawl 47, the tension being given by a spring 47'. Said pawl engages with a ratchet 48, which is mounted fast on shaft 40. When the segment 43 is moved to the right in Fig. 1, said pawl 47 will trail over the ratchet, and when the segment is moved to the left in Fig. 1 the pawl will engage the ratchet and cause it to rotate. A hand-lever 49 is secured intermediate its ends fast to the rock-shaft 45. Connected with the tail-arm 50 of said lever 49 opposite the handle end is one end of a spiral spring 51, the other end of said spring being connected with the base 12 of the machine.

When the handle end of the lever 49 is pressed down, the tail end is turned up and expands the spring 51, and at the same time the segment-rack is turned to the right in Fig. 1. When the lever 49 is released, the contraction of the spring 51 pulls down the tail end of the lever 49, and thereby turns back the rock-shaft 45 and also turns back the segment-rack 43—that is, to the left in Fig. 1. The turning back of segment 43 turns pinion 42, ratchet 48, with which the pawl 47, carried by the pinion 42, is now engaged, and main shaft 40.

A lever 52 is pivoted at its lower end to shaft 45 and is pivotally connected at its upper end with the connecting-rod 33, which operates the three-arm lever previously described. The lever 52 is slotted to permit passage of the shaft 40 through it.

Mounted fast on shaft 40 is a ratchet 58, and mounted loose on said shaft is a disk 55, carrying a pawl 57, which is adapted to engage with said ratchet, so that when the shaft rotates in the direction of the arrow in Fig. 1, as it does under the action of spring 51, the disk 55 will be rotated therewith. Carried by said disk 55 is an arm 54, which revolves with said disk. On lever 52 is a projection 56, with which the arm 54 engages during the first part of the return movement of the segment under the action of the spring 51 and turns said lever 52 for a short distance to the left in Fig. 1, thereby moving connecting-rod 33 far enough to the left to open the gates to both passages from the hopper. After the arm 54 has moved the lever 52 a short distance, as above described, the said arm 54 rides past the projection 56.

A disk 59 is adjustably secured to the face of disk 55, as by a bolt passing through a slot in disk 59, so that the said disk 59 may be rotatably adjusted with relation to the disk 55. The disk 59 has a peripheral flange forming a shoulder 60, which is adapted to engage a projection 61 on the connecting-rod 33, so as to move the rod 33 to the right in Fig. 1. By adjusting the disk 59 on the disk 55 the engagement of the shoulder 60 with the projection 61 may be made to occur at any predetermined point in the rotation of the shaft 40, so as to leave the main-stream gates open a longer or shorter period, as determined.

The relation of the shoulder 60 to the projection 61 is such that it will not throw the rod 33 the full length of its stroke to the right, but only far enough to effect the closing of the main-stream gates without closing the drip-stream gate, and in the continued rotation of the disk 59 the shoulder 60 will ride out of engagement with the projection 61. The movement to the right in Fig. 1 of the rod 33 by the engagement of shoulder 60 with projection 61 will be sufficient to carry link 63 down far enough to bring the upper end of slot 62 into engagement with the stud 39, and although the main-stream gates are closed the drip-stream will continue to flow until the rod 33 is moved still farther to the right.

The mechanism for causing the completion of the closure movement to shut off the drip-stream is controlled by the tipping of the scale-beam and is as follows: A ratchet-wheel 64 is fast upon shaft 40. A pawl 65 is pivoted to rod 33 by a stud 66 and is adapted to engage with said ratchet, but is normally kept out of such engagement by a roll 67 on the end of arm 68 of a lever 69, fulcrumed at 70 to the standard of the machine. Arm 68 is connected by a link 71 with an arm 72 on a rock-shaft 73. The rock-shaft 73 extends through a slot in the standard and has a downwardly-extending arm 74, which engages the end of a lever 75, fulcrumed at 76, the other end of said lever 75 projecting over a hook 77, which hangs from the weighted end of the scale-beam 18. The longer arm of lever 75 overweighs the shorter arm enough so that the shorter arm will remain in engagement with the arm 74 and prevent the turning of rock-shaft 73 and dropping of link 71 until the arm 75 is released from engagement with vertical arm 74.

When the receptacle has received its required load, the scale-pan descends, tipping the scale-beam, thus raising the weighted end of the scale-beam, from which the hook 77 depends. The hook 77 tips the lever 75 and releases the lower end of arm 74, whereupon the rock-shaft 73 permits the link 71 to drop, pulling down the arm 68 of lever 69 and the roll 67, so that the pawl 65 will engage the ratchet 64. The ratchet 64 being still in rotation, it will, through the pawl 65, which is connected with rod 33, move rod 33 still farther to the right and turn the three-arm lever sufficiently to carry the link 63 down far enough to close the gate 15 of the drip-stream outlet.

When the rod 33 approaches the end of its movement for closing the gates, a pin 78, which projects from said rod 33, engages an arm 79 of lever 69 and turns said lever to raise the roll 67, and thereby disengage pawl 65 from ratchet 64.

In order to prevent the dropping of the arm 74 by a depression of the scale-pan due to the impact of the first material delivered from the chute, an abutment is provided which during the delivery of the main stream supports the scale-pan. This abutment is indicated at 80, and it is mounted upon a rock-shaft 81, which is connected by an arm 82 and a link 83 with a bell-crank 84, pivoted at 85 on the upper end of the standard 11. Between the head of the stud 85 and the bell-crank 84 is placed a friction-washer 86, so as to frictionally hold the bell-crank in any position to which it may be moved. The bell-crank 84 is moved to the left to locate the abutment under the scale-beam by a pin 87 on the connecting-rod 33, the movement of the link or connecting-rod 33 to position to open the gates causing the engagement of the pin 87 with the bell-crank 84. In order that the abutment may be removed from below the scale-beam after the main stream has been delivered to the scale-pan and a drip-stream is being delivered, an arm 88 is attached to the bell-crank and is projected rearwardly, so that its head 89 is in the path of a pin 90 on the disk 59. This pin 90 engages the head 89 of the arm 88 to rock the bell-crank 84 about its stud 85 and move the abutment 80 to an inactive position to permit the scale-pan to be depressed when the proper weight of material has been delivered thereto.

It is intended that when a segment-rack is provided to give rotation to the shaft 40 one complete movement of the segment will cause one revolution of the shaft, and the rapidity of feed will be such that ordinarily only one rotation will be necessary. Provision is made, however, such that if the handle 49 is not depressed far enough to bring the segment back far enough before releasing to give it the full movement intended or if for any reason when a full movement is given the scale does not tip and an additional supply is required through the drip-supply the pawl 57 will be disengaged from ratchet 58 at the end of its movement, so that the disk 55 cannot move farther, and then the handle can be depressed part way down and released to give still further movement to the rotary feed, and this can be repeated until the scale-beam tips. The mechanism for accomplishing this is as follows: A stop-lever 93 is pivoted to a bracket 92, the pivot-axis being at right angles to the axis of shaft 40. The upper end of this stop-lever is in the path of the tail of pawl 57, so that when the disk 55 and pawl 57 have made a complete rotation the tail of the pawl will engage the stop-lever 93 and the pawl will be disengaged from the ratchet 58, as shown in Fig. 6. Means are provided by which a full downward movement of the handle 49 will release the stop-lever and allow the pawl to again engage with ratchet 57; but while disengaged continued movement of the shaft 40 will not move the disk 55. The means provided for releasing the stop-lever are as follows: Secured to the rock-shaft 45 is an arm 94, having a wedge or cam 95, which when the lever 49 is moved its full downward limit engages the lower end of the stop-lever 93 and turns it out of engagement with the pawl 57 and holds it thus disengaged, as shown in Fig. 6, until the arm 94 is turned back by the movement of rock-shaft 45, which is effected by the spring 51 when the lever 49 is released, when the pawl will again be thrown into engagement with the ratchet, as shown in Fig. 7.

While the segment-rack has been described as the means of turning the shaft 40, the invention is equally applicable to a machine in which shaft 40 is driven continuously, as by a belt. In such case the rock-shaft 45, hand-lever 49, and the arm 94, with wedge 95 or equivalent devices, will preferably still be used, but merely as a starting device. The pawl 57 will be disengaged from the ratchet 58 at the end of each rotation the same as if the segment-rack is employed, and the stop-lever will hold it disengaged until operator pushes down the lever 49 to bring the cam-wedge back into engagement with the stop-lever. As soon as the disk 55 has started again the lever 49 may be released and the stop-lever will turn back into position to intercept the pawl at the end of its rotation. The lever 93 will swing back by gravity, or, if preferred, a spring might be employed to facilitate the movement.

The chamber of the hopper through which the material for the drip-stream is supplied is provided with an adjustable guide whereby the conduit may be varied for different classes of material. A rotary shaft carrying buckets or paddles is provided within the chamber to feed the material when it is in the form of beans or berries, which it is specially desired not to have bruised. The adjustable guide may be so set as to cause the material to be delivered to this rotary feed. Means are provided to start the rotary feed when the gates are opened and to stop the feed when the drip-stream gate is closed. When the guide is shifted to change the feed to the other conduit, so as not to pass through the rotary feed, the driving connection for the rotary feed will be disconnected.

The feed mechanism for the drip-stream will now be described.

Journaled in the side walls of the drip-stream chamber is a shaft 110, which projects outside of the chamber. Fixed to said shaft is a hub 111, carrying a series of blades or paddles 112, radially disposed as to the hub and disposed in staggering relation to each other, as shown in Figs. 4 and 5, each blade extending only part of the width of the chamber. Preferably disks 113 are placed at each end of the hub, set into the side walls of the chamber. The shaft rotates in the direction indicated by the arrow in Fig. 5.

In order to prevent the beans from falling through on the back side of the feeder and to direct them onto the upper sides of the blades, an inclined guide 114 is provided extending from the outer wall of the chamber very nearly to the feed-blade when in its horizontal position and having a downwardly-extending portion 115, which is concaved and set close up to the arc described by the ends of the blades just far enough away to clear them, so that the beans cannot fall through on that side.

Mounted in the walls of the hopper above the feeder and parallel with the shaft 110 is a shaft 116, having secured thereto an angle-plate having arms 117 118 so disposed with relation to each other that when in the position shown in Fig. 5 the arm 117 will close the entrance to one part of the chamber, and the arm 118 will guide the material to the other side of the chamber to fall onto the inclined guide 114 and be thence deflected onto the blades 112 as they come up. The shaft 116 is provided with a lever-arm 119, by which it may be turned on its axis. When it is set in the full-line position shown in Fig. 3, so as to bring the guide-plate into the position shown in Figs. 3 and 5, a pin 120 is inserted into a hole in the frame to hold the lever in that position. When it is desired to turn the guide-plate so as to close the right-hand passage shown in Fig. 5 and open the left-hand passage, the pin 120 is withdrawn and the lever turned to the dotted-line position shown in Fig. 3, bringing the guide-plate into the dotted-line position shown in Fig. 5, and the pin 120 is then inserted in the hole 121. (Shown in dotted lines in Fig. 3.) This latter will be the position when the rotary feed is not used, as in the case of ground coffee or other granular or fine material.

When the gate 15 is closed, it swings up against a guide 122, which may be an extension of the guard 115, which projects down into the extension 123 of the hopper, as shown in Fig. 5. When the gate 15 is open, it swings down into a vertical position, so that the gate itself forms one side of the passage and the material passes down between the gate and the guide 122.

In order to guide the material down to the passage between the gate and the guide 122 after it has been dropped from the buckets, guide-plates 124 and 125 are provided. One of the said guides, as 124, may be fixed. The other guide 125 is preferably made adjustable, as by mounting it on a stud 126, which may be turned to narrow the passage, as shown in dotted lines in Fig. 5. In order to turn the stud 126, it projects through the wall of the hopper and is provided with a lever 127. A pin 128 is employed to hold it in position.

It is important that when the rotary-wheel feed is to be employed it should be made to start when the drip-stream gate is opened and should be automatically stopped when the drip-stream gate is closed. Mechanism by which this is accomplished is shown and is described as follows: Mounted fast on shaft 40 is a sprocket-wheel 130. Mounted loose on shaft 110 is a sprocket-disk 131, connected with sprocket-wheel 130 by a chain 132. Splined to said shaft 110 is a clutch 133, which rotates with said shaft and is capable of sliding movement thereon. Formed in the face of disk 133 are a series of holes 134, and projecting from the contiguous face of the sprocket-wheel 131 is a pin 135, which is adapted to enter either of the holes 134 in the clutch-disk when the sliding disk is brought up to the sprocket-disk 133. Means are provided to separate the disks when the drip-stream gate is closed until it opens again. A spring 136, pressing against the opposite face of the disk 133 from that in which are the holes 134, presses the said disk toward the sprocket-disk when it is not positively held back, and when the sprocket-disk revolves and brings the pin 135 in alinement with one of the holes 134 the spring causes the two disks to become engaged with each other.

The means provided for disengaging the disk 133 when the drip-stream gate closes is as follows: Fulcrumed in a slot in the stud 137, projecting from the side of the hopper, is a lever having one arm 138, which engages with a groove 139 in the periphery of the clutch-disk 133, and another arm 138', which is engaged by a wedge-arm 140 on a lever 141, fixed to the rocking shaft 37. (See Figs. 2 and 3.) When the drip-stream gate 15 is closed, the arm 141 is turned up so that its wedge 140 engages the arm 138' in such manner as to hold the arm 138 in position to keep the clutch-disk 133 out of engagement with the sprocket-disk, as shown in Fig. 2. When the rocker-shaft 37 is turned in the manner already described to open the drip-stream gate, the arm 141 is turned down, so as to release the pressure of the wedge-arm on the arm 138' and leave it free to turn under pressure of the spring 136 on the clutch-disk 133, so that when the sprocket-disk has turned far enough to bring the pin 131 into alinement with one of the holes 134 in the clutch-disk the said spring 136 will cause the disks to become engaged, and thereby cause the feed-shaft 111 to revolve. When the rocker-shaft 37 turns in the reverse direction to close the drip-stream gate, it turns up the wedge-arm 140 and by the pressure of the wedge on the arm 138' turns arm 138 back and slides the clutch-disk 133 out of engagement with the sprocket-disk.

To operate the machine, the lever 49 is pressed down to bring the segment 43 over to the right as viewed in Fig. 1—that is, toward the front of the machine. The handle points to the front. When the handle is released, the spring 51 pulls the segment back to the left, the shaft 40 revolves and opens both sets of gates, the material flows freely through the load-stream conduit, and the wedge 140 is moved to release the detent on the clutch-disk, so that the rotary feed for the drip-stream starts. When the shaft 40 revolves far enough to bring shoulder 60 into engagement with projection 61 on rod 33, the main-stream gates will be closed and the drip-stream gate will remain open until the scale-beam tips, when the rod 33 will be thrown the remainder of its stroke to the right and the drip-stream gate closed and the clutch disengaged and the rotary feed stopped, as already described. When material is being weighed for which the rotary feed is not desired, the guide-plate 117 118 is set to the dotted-line position shown in Fig. 5 and the sprocket-chain is unshipped to prevent rotation of the shaft 110.

What I claim is—

1. A weighing-machine having a scale, two feed-passages for supplying material to a receptacle while on the scale, a closure device for each feed-passage, mechanism for actuating both closures, mechanism for controlling the closure-actuating mechanism to close one passage after a predetermined period of time without closing the other, and mechanism controlled by the tipping of the scale-beam to actuate the closure mechanism to close the other feed-passage.

2. A weighing-machine having a scale, two feed-chutes for supplying material to a receptacle while on the scale, the outlet from one feed-chute being of smaller area than the other, separate gates for controlling the outlet from each chute, mechanism for actuating both gates, time mechanism for controlling the closing of the gate to the larger outlet, and mechanism controlled by the tipping of the scale to control the closing of the gate for the smaller outlet.

3. A weighing-machine having a scale, a hopper having two feed-chutes both of which conduct material to a receptacle while on the scale, gates for the outlet from each feed-chute, a rocking member having separate intermediate mechanism connecting with the gates for each outlet, means for turning said rocking member in a direction to open both sets of gates and allow material to flow through both outlets into the same receptacle, means for turning said rocking member in the reverse direction after a predetermined period of time a portion only of its full return movement, the intermediate connections being constructed so that said partial return movement will close the gates to one outlet and not close the gate to the other outlet, and mechanism controlled by the tipping of the scale-beam to control the actuating mechanism to turn said rocking member the remainder of its return stroke, the connections with the gate to the said second outlet being actuated by the said rocking member during its second period of return movement to close the gate of said second outlet.

4. A weighing-machine having a scale, two feed-chutes both of which conduct material to a receptacle while on the scale-pan, gates for the outlet from each feed-chute, a three-arm rocking lever, gate-operating mechanism connecting one arm of said lever with the gates of one outlet, gate-operating mechanism connecting another arm of said lever with the gate of the other outlet, mechanism connected with the third arm of said three-arm lever for rocking said lever in one direction to open the gates of both outlets, and in the reverse direction to close said gates, mechanism which controls the rocking mechanism to rock said lever a portion of its stroke in the reverse direction after a predetermined period of time and thereby actuate the gate-closing mechanism of one outlet, and mechanism controlled by the tipping of the scale to control the rocking mechanism to turn said three-arm lever the remainder of its closing movement and thereby actuate the gate-closing mechanism of the second outlet.

5. A weighing-machine having a scale, a hopper having two feed-chutes both of which conduct material to a receptacle while on the scale, gates for the outlet from each feed-chute, a multiple-arm rocking lever, a slotted gate-operating rocking lever having link connection with the gates of one outlet, a projection on one arm of said multiple-arm lever which engages with the slot of said gate-operating lever, said slot having the outer portion at an angle to the inner portion whereby the turning of said multiple-arm rocking lever will turn said gate-operating lever while the said projection moves in the inner portion of the slot and the angle of the outer portion of the slot permits further movement of said multiple-arm lever without actuating the said operating-lever, a slotted link connected with said multiple-arm lever, a lever engaging with the slot in said link and connected with the gate to said second outlet, said slot being so constructed that during the first period of the closing movement of the multiple-arm lever the slotted link will move the length of its slot without actuating the operating-lever of said second outlet-gate, and during the second period of closing movement of the multiple-arm lever it will actuate said operating-lever to close said second outlet-gate, means for turning said multiple-arm rocking lever in a direction to open said gates, means for causing a limited reverse rocking movement far enough to turn said operating-levers to close one outlet after a predetermined period of opening, and means controlled by the tipping of the scale to actuate the said multiple-arm lever through the completion of its movement to close the second outlet.

6. A weighing-machine having a scale, two feed-chutes both of which conduct material to a receptacle while on the scale-pan, gates for the outlet from each feed-chute, a rocking lever, separate mechanisms connecting the gates of each outlet with said rocking lever, mechanism for rocking said lever in one direction to open the gates of both outlets, and in the reverse direction to close said outlets, the connections being so constructed that the said rocking lever must move farther to close one outlet than to close the other outlet, time mechanism for controlling the rocking mechanism to move a limited distance and to close the first outlet, and mechanism controlled by the tipping of the scale-beam to control the further movement of the rocking arm to close the gate to the second outlet.

7. A weighing-machine having a hopper, a rotary horizontal shaft extending transversely through the feed-passage in said hopper, a series of outwardly-radiating paddle-blades secured thereto, each blade extending only a portion of the width of the passage, the successive blades being arranged in staggering relation to each other each pocket between the blades being connected with both adjacent pockets.

8. A weighing-machine having a hopper, a rotary shaft extending transversely through the passage in said hopper, a hub on said shaft extending the full width of the passage, a series of outwardly-radiating paddle-blades secured to said hub, each blade extending from one end of the hub only part of the width of the passage, the alternate blades beginning from opposite end of the hub and each pocket between any two blades being connected with both adjacent pockets.

9. A weighing-machine having a hopper, a rotary horizontal shaft through the passage in the hopper, a series of feed-buckets carried by said shaft, a deflector in the hopper above said feed-buckets which guides the material to the side of the passage in which are the upcoming buckets, and a second deflector between the upcoming buckets and the side of the hopper which guides the material into the upcoming buckets and a guard which prevents the material from falling down through the hopper past the upcoming buckets.

10. A weighing-machine having a hopper, a rotary feed extending transversely of the passage in the hopper, an adjustable deflector which may be adjusted to guide the material to either the front or the rear side of the rotary feed and which when adjusted to open the entrance to one side will close the entrance to the other side.

11. A weighing-machine having a scale, two feed-passages for supplying material to a receptacle while on the scale, a closure device for the outlet from each feed-passage, means for opening both closures, means for operating the closure to close one outlet after a predetermined period of time without closing the other, mechanism controlled by the tipping of the scale-beam to operate the closure which closes the other outlet, a rotary horizontal feed which extends transversely of the scale-controlled feed-passage and controls the passage of material within the hopper, and means controlled by the closure-opening mechanism to start the rotary feed when the gate opens.

12. A weighing-machine having a scale, two feed-passages for supplying material to a receptacle while on the scale, a closure device for the outlet from each feed-passage, means for opening both closures, means for operating the closure to close one outlet after a predetermined period of time without closing the other, mechanism controlled by the tipping of the scale-beam to operate the closure which closes the other outlet, a rotary horizontal feed which extends transversely of the scale-controlled feed-passage and controls the passage of material within the hopper, and means controlled by the closure-opening mechanism to start the rotary feed when the gate opens, and means controlled by the closing of the scale-controlled closure to stop the rotary feed.

13. A weighing-machine having a scale, two feed-chutes conducting to a receptacle on the scale, gates for the outlets from both feed-chutes, a reciprocable member having separate connections with the gate for each outlet, means for moving said reciprocable member in one direction to open the gates for both outlets, means for reciprocating said gate-operating member a part only of its full stroke in the reverse direction after a predetermined period of time and thereby closing the gate to one feed-chute, and mechanism controlled by the tipping of the scale to throw the said reciprocable member the remainder of its stroke in said reverse direction and thereby closing the gate for the other feed-chute.

14. A weighing-machine having a scale, a hopper, a gate for the outlet from the hopper, a rocker-shaft, a rocker-arm carried by said shaft and having connections with said gate whereby the rocking of said shaft will open and close said gate, mechanism controlled by the tipping of the scale to turn said rocker-shaft in a direction to close said gate, a rotary feed within said hopper, driving mechanism and a clutch connection between said driving mechanism and the rotary feed, intermediate mechanism actuated by said rocker-shaft when it turns in a direction to close the said gate to disengage said clutch connection with the driving mechanism and hold it disengaged and thereby stop the rotary feed, the said detent for the clutch being released by the turning of the said rocker-shaft in a direction to open the said gate, and mechanism which causes engagement of the members of said clutch to start said rotary feed when the said detent is released.

15. A weighing-machine having a scale, two feed-chutes, gates for the outlets from each chute, a reciprocable member having intermediate connections to open and close the gates for both said outlets whereby the movement of said reciprocable member in one direction opens the gates and the movement a certain distance in the reverse direction closes the gates of one outlet and a certain farther distance closes the gate of the other outlet, driving mechanism, means operated by said driving mechanism which after a predetermined period of time moves said reciprocable member a limited part of its gate-closing stroke, the gate-closing mechanism of one of said outlets being actuated by said reciprocable member during said limited movement, mechanism controlled by the tipping of the scale which brings said reciprocable member again into operative connection with the driving mechanism whereby said reciprocable member is given a further movement in the gate-closing direction and actuates the gate-closing mechanism of the other outlet.

16. A weighing-machine having a scale, two feed-chutes, gates for the outlets from each chute, a reciprocable member having intermediate connections to open and close the gates for both of said outlets whereby the movement of said reciprocable member in one direction opens the gates and the movement a certain distance in the reverse direction closes the gates of one outlet and a certain farther distance closes the gate of the other outlet, driving mechanism, means operated by said driving mechanism which after a predetermined period of time moves said reciprocable member a limited part of its gate-closing stroke, the gate-closing mechanism of one of said outlets being actuated by said reciprocable member during said limited movement, mechanism controlled by the tipping of the scale which brings said reciprocable member again into operative connection with the driving mechanism whereby said reciprocable member is given a further movement in the gate-closing direction and actuates the gate-closing mechanism of the other outlet, a rotary feed within the feed-chute whose outlet is controlled by the tipping of the scale, a clutch connection between said rotary feed and said driving mechanism, mechanism actuated by the scale-controlled gate-closing mechanism when it closes the gate to disengage said clutch and hold it disengaged, said detent being released by the gate-opening movement, and mechanism which again throws said clutch into operative connection when the said detent is released.

17. A weighing-machine having a scale, two feed-chutes, gates for the outlets from each chute, a reciprocable member having intermediate connections to open and close the gates for both of said outlets whereby the movement of said reciprocable member in one direction opens the gates and the movement a certain distance in the reverse direction closes the gates of one outlet and a certain farther distance closes the gates of the other outlet, driving mechanism, means operated by said driving mechanism which after a predetermined period of time moves said reciprocable member a limited part of its gate-closing stroke, the gate-closing mechanism of one of said outlets being actuated by said reciprocable member during said limited movement, mechanism controlled by the tipping of the scale which brings said reciprocable member again into operative connection with the driving mechanism whereby said reciprocable member is given a further movement in the gate-closing direction and actuate the gate-closing mechanism of the other outlet.

In testimony whereof I have affixed my signature in presence of two witnesses.

WILLIAM S. SCALES.

Witnesses:
WILLIAM A. COPELAND,
ROBERT WALLACE.